Patented Jan. 27, 1948

2,435,018

UNITED STATES PATENT OFFICE 2,435,018

PROCESS FOR THE PRODUCTION OF UNSATURATED ALDEHYDES

Leopold Ruzicka, Zurich, Switzerland, assignor to Ciba Pharmaceutical Products, Incorporated, Summit, N. J., a corporation of New Jersey No Drawing. Application October 23, 1942, Serial No. 463,131. In Switzerland September 13, 1941

Section 1, Public Law 690, August 8, 1946
Patent expires September 13, 1961

10 Claims. (Cl. 260—397.2)

To the class of $\alpha:\beta$-unsaturated aldehydes belong a series of natural substances which possess technical interest either themselves or as starting products in the manufacture of other valuable compounds. For example the $\alpha:\beta$-unsaturated aldehydes may be transformed easily to the corresponding alcohols e. g. vitamin A, phytol, Nerol etc., some of which are of importance also as intermediate products for further syntheses (vitamin E, vitamin K). By condensation of $\alpha:\beta$-unsaturated aldehydes with acetone the valuable perfumes of the ionone or irone type, for example, can be obtained. In general, these reactive compounds are suitable intermediate products for various syntheses.

For this reason several methods for the preparation of $\alpha:\beta$-unsaturated aldehydes have already been worked out. Most of them depend on a reduction of the corresponding carboxylic acid or certain functional derivatives of same, such as the nitrile etc. Some of these processes are only utilisable in special cases and the methods of reduction are mostly complicated and the yields unsatisfactory.

It has now been found that thermic splitting of $\alpha$-keto-$\gamma$-lactones or their functional derivatives leads to the production of $\alpha:\beta$-unsaturated aldehydes or their derivatives. The scheme of the reaction can be seen from the general Formulas I and II in which $R_1$, $R_2$ and $R_3$ represent hydrogen or any aliphatic, alicyclic, aromatic or heterocyclic radicals which may be connected by any carbon chain or hetero atoms.

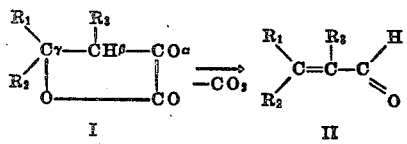

The $\alpha$-keto-$\gamma$-lactones used as starting products, which may also be called 2:3-dioxo-tetrahydro-furanes, are easily obtainable by several methods and the most different representatives of this class of compounds are known. Lactones of the general Formula I can be obtained for example by condensation of $\alpha$-keto-acids of the formula $R_3$—$CH_2$—$CO$—$COOH$ with carbonyl compounds $R_1$—$CO$—$R_2$ (cf. Erlenmeyer and co-workers, Liebig's Annalen, 333, 171, 1904).

Other $\alpha$-keto-$\gamma$-lactones are for example obtainable by the process of Kötz and Meyer (Journal für praktische Chemie (2), 88, p. 261). By the latter process ketones are condensed with oxalates, unsaturated $\alpha$-keto-$\gamma$-lactones being thus at first obtained, which subsequently can be converted by hydrogenation into saturated $\alpha$-keto-$\gamma$-lactones. It was found in contradiction to the statements of Kötz and Meyer (loc. cit., p. 263) that also such ketones are converted under suitable conditions into the $\alpha$-keto-$\gamma$-lactones mentioned, which have no substituent in the neighbourhood of the keto group, e. g. cyclohexanone.

Other processes also may serve for the manufacture of suitable $\alpha$-keto-$\gamma$-lactones.

The thermic splitting of the $\alpha$-keto-$\gamma$-lactones which takes place with the elimination of carbon-dioxide may be carried out in the presence of catalysts and/or diluents. Suitable catalysts are among others those substances which are known to eliminate carbon-dioxide in other reactions also, e. g. copper or generally metals, particularly in powder form. A number of surface active substances such as active charcoal, bleaching earth, etc. also sometimes promote the reaction. Finally substances which react intermediately with the keto or lactone group, e. g. amines or hydrazine derivatives, may favour the thermic splitting; or corresponding functional derivatives of $\alpha$-keto-$\gamma$-lactones may be directly submitted to decomposition by heat. In this way functional derivatives of the unsaturated aldehydes may be obtained instead of the aldehydes themselves. Easily volatile $\alpha$-keto-$\gamma$-lactones are best decomposed under pressure or in the vapour phase. With difficultly volatile compounds the use of a vacuum, with simultaneous distillation of the products of the splitting, is useful. The most favourable decomposition temperature is dependent on the constitution of the compounds. It is preferable to carry out the splitting in the absence of oxygen, i. e. in an inert gas or in a vacuum, in order to prevent oxidation of the sensitive aldehydes. Splitting begins in general a little above the melting point and is accompanied by considerable generation of carbon-dioxide. Finally, any functional aldehyde derivatives obtained, such as the aniles, may be, if desired, converted into the free aldehydes, e. g. with the aid of hydrolysing agents.

The crude aldehydes obtained, which generally contain some hydrocarbons and small quantities of acids can be purified by the usual methods. Carbonyl reagents, such as hydrazine and its derivatives, e. g. semicarbazide, a halide of trimethylaminoacetic acid hydrazide etc., are suitable for the preparation of the pure product. Physical methods, such as distillation, crystallisation and chromatography, are however often sufficient to purify the α, β-unsaturated aldehydes.

According to the new process, for example, the previously unknown $\Delta^2$-2-formyl-cholestene can be obtained from cholesterol, via the lactone of 2-oxalyl-3-hydroxy-cholestane. In a similar way $\Delta^1$-tetrahydro-benzaldehyde is obtained from cyclohexanone via the hexahydro-cumaranedione, and the tetrahydro-m-tolylaldehyde from 2-methyl-cyclohexanone. α-phenyl-cinnamylaldehyde is obtained together with some stilbene, by thermic splitting of 2:3-diphenyl-4:5-dioxo-tetrahydrofurane.

The new process is particularly valuable as it enables the preparation, in a simple manner and with good yields, also of such α:β-unsaturated aldehydes which cannot be prepared at all or only with difficulty in other ways.

Example 1

600 mg. of the lactone of 2-oxalyl-3-hydroxy-cholestane (Helvetica Chemica Acta, vol. 21, p. 1723, 1938) of M. Pt. 242° C., are distilled in a vacuum obtained with a water-jet pump. The distillate is dissolved in hexane and filtered through aluminium oxide (prepared by the Brockmann method). On extracting with benzene, 300 mg. of a compound melting at 132° C. are obtained, which, judging from its properties and reactions, must be regarded as $\Delta^2$-2-formyl-cholestene. Its oxime melts at 164° C.; it can also be obtained directly if the lactone of the 2-oxalyl-3-hydroxy-cholestane is treated with hydroxylamine before the thermic decomposition.

Example 2

The enol-acetate of hexahydro-cumaranedione is prepared from 2-oxalyl-cyclohexanone of M. Pt. 126° C. (Kötz and Michels, Liebig's Annalen, vol. 350, p. 211, 1906) by boiling with acetic anhydride, and hydrogenation of the tetrahydro-cumaranedione-enol-acetate (M. Pt. 92° C.) obtained. The compound is then saponified to hexahydro-cumaranedione of M. Pt. 101° C.

150 mg. of the latter product are distilled in a current of carbon dioxide at ordinary pressure. The distillate is purified by fractional redistillation. The main fraction has the properties of $\Delta^1$-tetrahydrobenzaldehyde. The latter gives a semicarbazone, M. Pt. 216° C., and an oxime, M. Pt. 99° C.

Example 3

7-methyl-4:5,6:9 - tetrahydro-cumaranedione-3-enol-acetate of M. Pt. 78° C. (Kötz, Journal für praktische Chemie (2), vol. 88, p. 267, 1913) gives, on hydrogenation and saponification, the 7-methyl-hexahydro-cumaranedione of M. Pt. 108° C. 1 g. of the latter is heated under reflux in a current of nitrogen until the generation of carbon-dioxide has abated. The residue is distilled and gives as main fraction tetrahydro-m-tolylaldehyde in 60% yield. Its semicarbazone melts at 206° C.

Example 4

500 mg. 2:3-diphenyl-4:5-dioxo-tetrahydrofurane are heated in 2 ccm. quinoline containing a little powdered copper until the generation of carbon-dioxide has ceased. The reaction mixture is poured into dilute acid and extracted with ether. After washing with dilute acid, α-phenyl-cinnamyl-aldehyde (M. Pt. 84° C.) is obtained from the ether residue together with some stilbene.

Instead of quinoline other diluents and instead of copper powder other catalysts may be used.

What I claim is:

1. $\Delta^2$-2-formyl cholestene.

2. A process for the manufacture of $\Delta^2$-2-formyl cholestene, which comprises subjecting the lactone of 2-oxalyl-3-hydroxy-cholestane to thermal splitting by distilling the same, and recovering the $\Delta^2$-2-formyl cholestene from the distillate.

3. A process of the character described, which comprises subjecting an α-X-γ-lactone, wherein X stands for a group selected from the class consisting of keto and groups convertible into keto with the aid of hydrolysis, to thermal splitting by heating the same to a temperature slightly above the melting point thereof whereby carbon dioxide is eliminated and the lactone ring is ruptured.

4. A process of the character described, which comprises subjecting an α-keto-γ-lactone to thermal splitting by heating the same to a temperature slightly above the melting point thereof whereby carbon dioxide is eliminated with rupture of the lactone ring and formation of the corresponding α:β-unsaturated aldehyde.

5. A process of the character described, which comprises subjecting an α-Y-γ-lactone, where Y stands for a group which is convertible to the keto group with the aid of hydrolysis, to thermal splitting by heating the same to a temperature slightly above the melting point thereof whereby carbon dioxide is eliminated and the lactone ring is ruptured.

6. A process according to claim 3, wherein the thermal splitting is effected in the presence of a catalyst and a diluent.

7. A process according to claim 4, wherein the thermal splitting is effected in the presence of a catalyst and a diluent.

8. A process according to claim 5, wherein the thermal splitting is effected in the absence of oxygen.

9. A process of the character described, which comprises subjecting an α-oxime-γ-lactone to thermal splitting by heating the same to a temperature slightly above the melting point thereof whereby carbon dioxide is eliminated with rupture of the lactone ring and formation of the corresponding α-β-unsaturated aldehyde-oxime.

10. A process of the character described, which comprises subjecting an α-hydrazone-γ-lactone to thermal splitting by heating the same to a temperature slightly above the melting point thereof whereby carbon dioxide is eliminated with rupture of the lactone ring and formation of the corresponding α:β-unsaturated aldehyde-hydrazone.

LEOPOLD RUZICKA.

REFERENCES CITED

The following references are of record in the file of this patent:

FOREIGN PATENTS

| Number | Country | Date |
| --- | --- | --- |
| 8,248 | Great Britain | 1899 |

OTHER REFERENCES

Plattner et al., "Helv. Chim. Acta," vol. 24, pages 1459 to 1464 (published Dec. 1, 1941).